US012795542B2

(12) United States Patent
Bala

(10) Patent No.: US 12,795,542 B2
(45) Date of Patent: Nov. 10, 2026

(54) WAKE-UP SIGNAL FRAME DESIGN

(71) Applicant: Rakuten Symphony, Inc., Tokyo (JP)

(72) Inventor: Erdem Bala, San Mateo, CA (US)

(73) Assignee: RAKUTEN SYMPHONY, INC., Tokyo (JP)

( * ) Notice: Subject to any disclaimer, the term of this patent is extended or adjusted under 35 U.S.C. 154(b) by 687 days.

(21) Appl. No.: 18/020,327

(22) PCT Filed: Jan. 13, 2023

(86) PCT No.: PCT/US2023/010729

§ 371 (c)(1),
(2) Date: Feb. 8, 2023

(87) PCT Pub. No.: WO2024/072476

PCT Pub. Date: Apr. 4, 2024

(65) Prior Publication Data

US 2024/0323846 A1 Sep. 26, 2024

Related U.S. Application Data

(60) Provisional application No. 63/411,296, filed on Sep. 29, 2022.

(51) Int. Cl.
*H04W 52/02* (2009.01)

(52) U.S. Cl.
CPC ................................ *H04W 52/0235* (2013.01)

(58) Field of Classification Search
None
See application file for complete search history.

(56) References Cited

U.S. PATENT DOCUMENTS

| | | | | |
|---|---|---|---|---|
| 10,873,909 | B1 * | 12/2020 | Chu | H04W 52/0229 |
| 2016/0127995 | A1 | 5/2016 | Merlin et al. | |
| 2016/0242115 | A1 | 8/2016 | Jafarian et al. | |
| 2018/0324717 | A1 * | 11/2018 | Zhou | H04W 52/0235 |
| 2019/0007901 | A1 * | 1/2019 | Asterjadhi | H04W 52/0229 |
| 2019/0082385 | A1 * | 3/2019 | Shellhammer | H04L 47/25 |
| 2019/0297575 | A1 * | 9/2019 | Seok | H04W 52/0229 |
| 2019/0306811 | A1 | 10/2019 | Balakrishnan et al. | |
| 2021/0144645 | A1 * | 5/2021 | Huang | H04W 52/0235 |
| 2024/0284456 | A1 * | 8/2024 | Elkotby | H04W 76/19 |

OTHER PUBLICATIONS

International Search Report issued May 2, 2023 in International Application No. PCT/US 23/10729.
Written Opinion issued May 2, 2023 in International Application No. PCT/US 23/10729.

* cited by examiner

*Primary Examiner* — Diane L Lo
(74) *Attorney, Agent, or Firm* — Sughrue Mion, PLLC

(57) ABSTRACT

A system and method of generating a wake up signal (WUS) within a wireless communication system is provided, the method including generating, by at least one cell station, a WUS comprising a user frame and a system frame, wherein the user frame comprises a first preamble and a first data portion, and the system frame comprises a second preamble and a second data portion; receiving, by the wake up radio (WUR), the WUS; identifying, by the WUR, the WUS; and based on the identification of the WUS by the WUR, activating the conventional receiver.

17 Claims, 5 Drawing Sheets

WAKE-UP SIGNAL FRAME DESIGN

CROSS-REFERENCE TO RELATED APPLICATION

This application is a National Stage of International Application No. PCT/US2023/010729 filed Jan. 13, 2023, which is based on and claims priority to U.S. Pat. App. No. 63/411,296, filed on Sep. 29, 2022 in the U.S. Patent and Trademark Office (USPTO), the disclosure of which is incorporated herein by reference in its entirety.

BACKGROUND

1. Field

Apparatuses and methods consistent with example embodiments of the present disclosure relate to a frame format for wake-up signal (WUS) that can be incorporated in 3GPP 5G NR.

2. Description of Related Art

Low power wake-up radio (WUR) in the related art is a type of receiver that can operate with lower power than a traditional receiver. A user equipment (UE) may have both a conventional receiver and a low power wake-up radio. To save power, the conventional receiver, when applicable (for example, when the UE is in idle mode or DRX mode), may be put in a low power consumption state. In this state, the conventional receiver may be turned off (i.e., not receive or transmit any signal), or may be in an almost-off mode. While the conventional receiver is in this state, the WUR may be in an operating mode and may be monitoring for a wake-up signal (WUS). If the WUS is detected and the WUS indicates to the UE to turn on the conventional receiver, the UE turns on the conventional receiver and may start performing the legacy transmit/receive procedures. For example, it may detect the serving cell, acquire the system information, perform random access, etc.

The two common designs for the waveform used to generate the WUS are ON-OFF keying (OOK) and Frequency Shift Keying (FSK). OOK is adopted in IEEE 802.11ba. In OOK, the waveform includes ON and OFF patterns in time domain and a specific pattern is used to convey information. For example, (ON OFF) may be conveyed by bit “1”, while (OFF ON) may be conveyed by bit “0”. In FSK, the frequency of the waveform conveys information. For example, if a pulse is transmitted on or around frequency f0, bit “0” is conveyed, and if the pulse is transmitted on or around frequency f1, bit 1 is conveyed.

SUMMARY

According to embodiments, systems and methods are provided for generating a new frame format for a WUS that can be incorporated into 3 GPP 5G NR.

According to an embodiment, a wireless communication system is provided. The wireless communication system includes an at least one cell station comprising an at least one cell station processor and an at least one cell station memory, wherein the at least one cell station memory is configured to store computer program code; and an at least one user equipment comprising a conventional receiver and a wake up radio (WUR), wherein the WUR comprises an at least one WUR processor and an at least one WUR memory, wherein the at least one WUR memory is configured to store computer program code, wherein the at least one cell station processor is configured to access the at least one cell station memory and, by executing the computer program code stored therein, generate a wake up signal (WUS) comprising a user frame and a system frame, wherein the user frame comprises a first preamble and a first data portion, and the system frame comprises a second preamble and a second data portion, and wherein the WUR is configured to receive the WUS and the at least one WUR processor is configured to access the at least one WUR memory and, by executing the computer program code stored therein, identify the WUS and activate the conventional receiver.

Here, the system frame may include one or more of an information on a cell ID, an information on a duty cycle of the WUS, a synchronization signal, and an information on a coding rate of the user frame. Additionally, the user frame may include an information on a portion of the WUS that should be disregarded by the WUR. Further, a coding rate of the system frame may be different than a coding rate of the user frame.

Here, the first data portion may include a control portion and a user data portion, the control portion may have a different coding rate than the user data portion, and the control portion may include an information on the coding rate of the user data portion.

Here, the WUS may include one of a plurality of On-Off-Key (OOK) waveform symbols and a plurality of frequency shift key (FSK) waveform symbols.

Here, the at least one WUR processor may be further configured to access the at least one WUR memory and, by executing the computer program code stored therein, identify a second cell station in communication with the WUR, and based on the identification of the second cell station activate the conventional receiver.

According to another embodiment, a method of generating a wake up signal (WUS) in a wireless communication system, where the wireless communication system includes at least one cell station and at least one user equipment including a conventional receiver and a wake up radio (WUR), includes: generating, by the at least one cell station, a wake up signal (WUS) comprising a user frame and a system frame, wherein the user frame comprises a first preamble and a first data portion, and the system frame comprises a second preamble and a second data portion; receiving, by the WUR, the WUS; identifying, by the WUR, the WUS; and based on the identification of the WUS by the WUR, activating the conventional receiver.

Here, the system frame may include one or more of an information on a cell ID, an information on a duty cycle of the WUS, a synchronization signal, and an information on a coding rate of the user frame.

Here, the user frame may include an information on a portion of the WUS that should be disregarded by the WUR. user frame.

Here, a coding rate of the system frame may be different than a coding rate of the Here, the first data portion may include a control portion and a user data portion, the control portion may have a different coding rate than the user data portion, and the control portion may include an information on the coding rate of the user data portion.

Here, the WUS may include one of a plurality of On-Off-Key (OOK) waveform symbols and a plurality of frequency shift key (FSK) waveform symbols.

Additionally, the method may further include: identifying, by the WUR, a second cell station in communication with the WUR; and based on the identification of the second cell station by the WUR, causing the conventional receiver to become active.

According to another embodiment, a non-transitory computer readable medium having instructions stored therein is provided, which when the stored instructions are executed by a processor cause the processor to execute a method of generating a wake up signal (WUS), the method including: generating, by an at least one cell station, a WUS comprising a user frame and a system frame, wherein the user frame comprises a first preamble and a first data portion, and the system frame comprises a second preamble and a second data portion; receiving, by a WUR, the WUS; identifying, by the WUR, the WUS; and based on the identification of the WUS by the WUR, activating the conventional receiver.

Here, the system frame may include one or more of an information on a cell ID, an information on a duty cycle of the WUS, a synchronization signal, and an information on a coding rate of the user frame.

Here, the user frame may include an information on a portion of the WUS that should be disregarded by the WUR.

Here, a coding rate of the system frame may be different than a coding rate of the user frame.

Here, the first data portion may include a control portion and a user data portion, the control portion may have a different coding rate than the user data portion, and the control portion may include an information on the coding rate of the user data portion. Additionally, the method may further may include: identifying, by the WUR, a second cell station in communication with the WUR; and based on the identification of the second cell station by the WUR, causing the conventional receiver to become active.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

Figure 1:
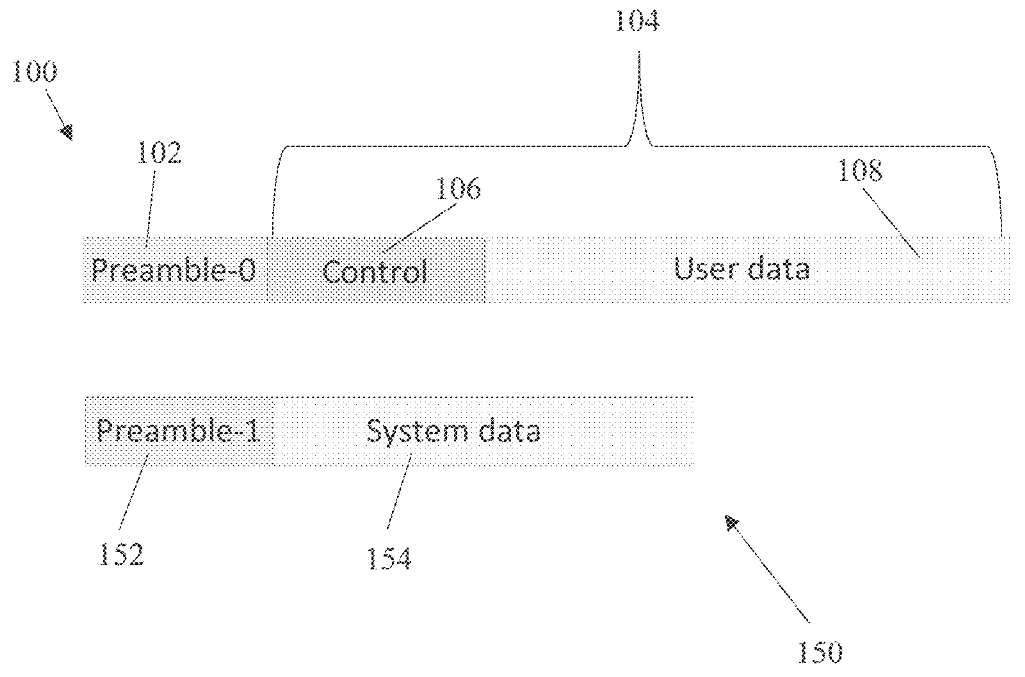
FIG. 1 illustrates two sample frame types according to one or more embodiments.
Figure 2:
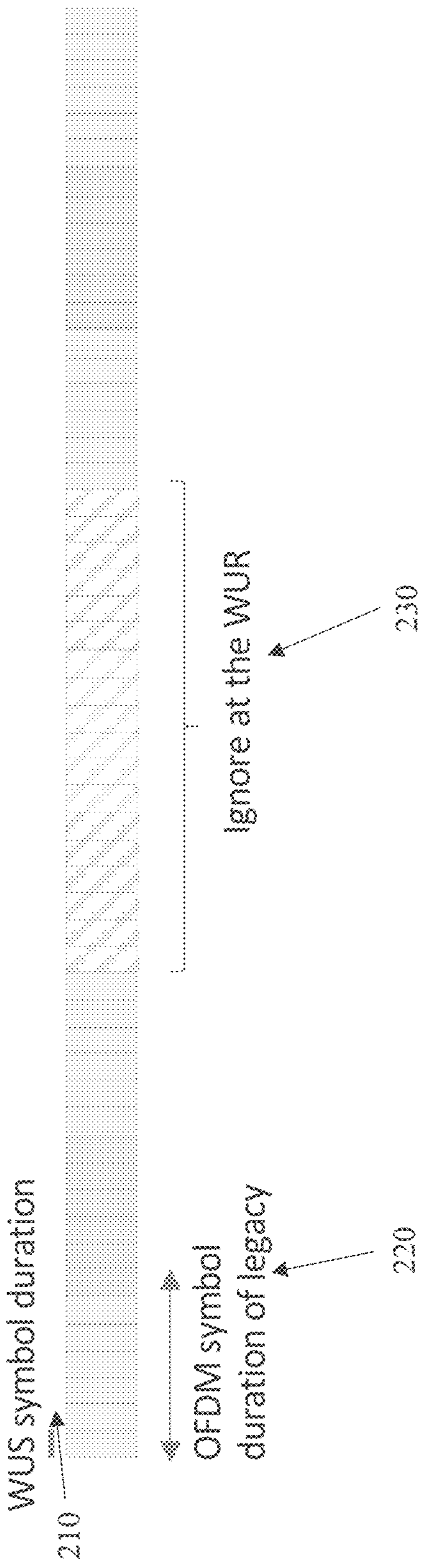
FIG. 2 illustrates a WUS frame according to an embodiment.

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open- ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Incorporating the WUR/WUS concept into the 3GPP New Radio framework needs to consider several issues such as the WUS frame design, and the impact of mobility on the WUR. In addition, if the WUS is transmitted in the same channel as the legacy channels, then in time division multiplexing (TDD) mode, the gNB cannot transmit in the symbols/slots allocated for uplink (UL) transmission.

Example embodiments provide a new frame format for WUS that can be incorporated in 3GPP 5G NR. In particular, example embodiments introduce two frame types, a system frame and a user frame. The system frame can be used for mobility purposes. The cell ID may be transmitted in the system frame where part of the cell ID may be transmitted in a synchronization sequence and part of the cell ID may be transmitted in the payload. The user frame can indicate to the UE which WUS symbols to ignore since those symbols may not contain WUS. As a result, power savings may be achieved at the UE side resulting in longer battery life.

WUS Frame Design

A WUS may include frames. There may be one or more types of frames. The type of a frame may be determined by at least the contents of the frame. For example, frame types may include user frame 100 and system information frame 150 as shown in FIG. 1.

A first type of frame (e.g., user frame 100) may contain at least one of a preamble 102 and a data part 104 where the data part 104 may contain a control part 106 and user data part 108. The preamble 102 may include one or a plurality of reference signals and/or one or a plurality of synchronization signals. A second type of frame (e.g., system information frame 150) may contain at least one of a preamble 152 and a system data part 154 where the system data part 154 may contain system information. The preambles of different frame types may be different. WUS frames may be transmitted by the transmitter with a duty cycle, that is, between two frames there may be gaps during which transmission of that frame type may not occur. The duty cycle of the user frames 100 may be indicated in the system frame 150. The duty cycle of the system frame 150 may be fixed and may be set/reset by higher layer signaling such as the Radio Resource Control (RRC).

A frame may comprise information bits, e.g., "1" and "0". In the following, information bits are shown in quotation mark when necessary to prevent confusion. Each information bit may be encoded as one or a plurality of a WUS waveform symbols. As an example, if OOK is used as the waveform, an ON symbol may be denoted as symbol 1 and an OFF symbol may be denoted as symbol 0. In an embodiment, information bits "0" and "1" may be encoded as "0": [OFF ON] =[0 1] and "1": [ON OFF] =[1 0].

Similarly, if FSK is used as the waveform, symbol 0 may be represented by a waveform generated using a first frequency and symbol 1 may be represented by a waveform generated using a second frequency. In this case, two options to encode information bits include: a first encoding method wherein the information bit is encoded as frequency transitions, for example, as a transition from a first frequency to a second frequency, for example: "0": [f0 f1]=[0 1] and "1": [f1 f0]=[1 0]; and, a second encoding method wherein the information bit is encoded by the frequency, for example: "0": [f0]=[0] and "1": [f1]=[1].

In one method according to an example embodiment, more than one coding rate may be supported. For example, with coding rate ½, information bits may be represented as "0":

[0 1] and "1": [1 0]. When coding rate ¼ is used, an information bit may be represented by four symbols; for example, "0": [1 0 1 0] and "1": [0 1 0 1].

The coding rate applicable to different frame types and/or parts of a frame type may be different. For example, a system information frame 150 may be encoded with coding rate ¼ whereas the coding rate of a user frame 100 may be ½ or ¼. In another use case, the preamble 102 and the control part 106 of a user frame 100 may be encoded with coding rate ¼ whereas the user data part 108 may be encoded with coding rate ¼ or ½.

In one method according to an example embodiment, the coding rate applicable to all or a part of a user frame 100 may be indicated in the system frame 150. The coding rate of the system frame 150 may be fixed (e.g., ¼). The coding rate of the user frame 100 or part of the user frame 100 (e.g., user data part 108) may be indicated in the system frame 150. In another method according to an example embodiment, the coding rate applicable to a first part of a user frame 100 may be indicated in a second part. For example, the coding rate of the user data part 108 may be indicated in the control part 106.

In an embodiment, the coding rate may be indicated by the synchronization signals. A synchronization signal may contain two or more sequences. As an example, in a first option, a synchronization sequence signal may comprise [x x] where x may be a vector of information bits. In a second option, a synchronization sequence signal may comprise [x $\underline{x}$] where $\underline{x}$ may be the conjugate of x. Conjugation may mean that the conjugate of "0" is "1", and the conjugate of "1" is "0". The first option of the synchronization signal may indicate a first coding rate and the second option of the synchronization signal may indicate a second coding rate. The coding rate of the synchronization signal may be fixed and known to the receiver.

In one method according to an example embodiment, the symbol duration 210 (also denoted as t) of a WUS symbol may take more than one possible value. For example, an ON or OFF signal in OOK signaling may be 2 microseconds or 4 microseconds. The symbol duration and coding rate together may determine the bit rate of the wake-up signal. The above methods disclosed for the coding rate may similarly be applied to the symbol duration. For example, the symbol duration used in the system frame 150 may be set to t0 (e.g., 4 microseconds) and the symbol duration used in the user frame 100 may be indicated in the system frame payload (e.g., system data 154).

In one method according to an example embodiment, the UE may keep a table of symbol duration and coding rate entries. The symbol duration-coding rate pair used in the system frame 150 may be fixed (e.g., set by the RRC before the conventional receiver goes into off mode and stored at the WUR) and the symbol duration-coding rate pair used in the user frame 100 may be indicated in the system frame payload (e.g., system data 154), for example, as an index to one of the entries in the table. In other methods, similar to the ones disclosed above, the symbol duration-coding rate pair may be indicated in the control part 106 of a user frame 100 and/or by using synchronization signals.

WUS Coexistence With Legacy Channels

The WUS may be transmitted in legacy channels. For example, a gNB may allocate 4 MHz of a 20 MHz channel to the WUS and use the remaining part of the channel for legacy NR channels such as the downlink shared channel. Note that since WUS frames may be transmitted with a duty cycle, the 4 MHz may not be allocated to WUS at all times but only when WUS frames are transmitted.

In some cases, the transmitter cannot transmit the WUS. For example, in a time division multiplexing (TDD) configuration, some slots and/or some OFDM symbols within a slot (e.g., OFDM symbol 220) may be allocated for uplink (UL) transmission, i.e., the gNB cannot perform downlink (DL) transmission. In one method according to an embodiment, a WUS frame may contain information used to indicate to the WUR which portions of the WUS frame to ignore since in those portions the gNB may be in UL receive mode and may not be actually transmitting in the DL. There may be some other use cases where certain portions of the WUS frame may need to be punctured. For example, the whole channel bandwidth (e.g., 20 MHz) may be used for downlink control channel (PDCCH) in the first three symbols in a legacy slot so WUS may not be transmitted during those symbols.

In one method according to an example embodiment, the portion of the WUS frame the WUR should ignore (e.g., due to non-transmission of the WUS in that portion), such as portion 230, may be indicated to the WUR. Ignoring may mean that the WUR does not estimate any WUS symbols in the time intervals corresponding to those portions or does not use the estimated symbols to decode the information bits.

In one method according to an example embodiment, if FSK is used as the WUS waveform, the receiver may determine that a specific WUS symbol may be ignored if at least one of the following applies: (1) the receiver estimates the signal in all possible frequencies (e.g., f0 and f1) and the signal power is below a threshold for all possible frequencies (i.e., no signal present); (2) the receiver estimates the signal in all possible frequencies and the signal power is above a threshold for all possible frequencies (i.e., another type of signal is present such as one of the legacy channels); or, (3) the receiver estimates the signal in all possible frequencies and the maximum difference in signal power is above or below a threshold.

In another method according to an example embodiment, the portion of the WUS frame to be ignored by the WUR 230 may be signaled to the WUR. Note that the duration of a WUS information bit may be shorter than the duration of the OFDM symbol for legacy system 220. For example, with 15 kHz subcarrier spacing, one legacy slot is 1 ms and there are 14 OFDM symbols in one slot, resulting in a legacy OFDM symbol duration of about 72 microseconds. The length of a WUS symbol, on the other hand, may be much shorter, e.g., 2 or 4 microseconds.

The portion of the WUS frame to ignore 230 may be signaled. For example, the control part 106 of the user frame 100 may include a bitmap where each bit in the bitmap may indicate if a certain number of WUS symbols in the user data part 108 should be ignored or not. For example, assume the user data portion 108 of the frame 100 contains M WUS symbols. With a length-k bitmap, each bit may indicate to the WUR whether to ignore or receive the corresponding M/k WUS symbols. The gNB scheduler may make sure that the control part 106 is always transmitted. In one method, the length of the frame 100 may be indicated or set to be fixed, and the ignored symbols 230 may be excluded from the frame length.

WUS Mobility

In some cases, the WUR may be mobile and may move from the coverage area of one cell to another cell. The new cell may not have information of the WUR or may not even support WUS. So, it is necessary that the WUR monitor the serving cell. This may be achieved by the WUR determining the cell ID and monitoring it (e.g., periodically). The cell ID may be determined as follows. The WUR may monitor the WUS frames, e.g., the system frame 150. One of the synchronization signals in the frame, e.g., a synchronization sequence, may be determined by the cell ID or part of the cell ID. The sequence may be a pseudo-random sequence, e.g., an m-sequence as in the primary synchronization sequence used in legacy 5G NR system. Note that the synchronization sequences are also transmitted by the WUS waveform. For example, if the sequence is S=["0" "0" "1" "0" "1" "1". . . ], then bits 0 and 1 may be transmitted with OOK, FSK, etc. waveforms. The synchronization sequence may be transmitted in the preamble 152 of the system information frame 150. For example, cell ID=cell–ID(1)+cell-ID(2). The WUR may determine cell-ID(1) from the received synchronization sequence, e.g., by correlating the received sequence with the set of template sequences corresponding to the possible cell-ID(1) values (e.g., cell-ID(1) may be 0, 1, and 2 corresponding to three possible synchronization sequences).

Another part of the cell ID (e.g., cell-ID(2)) may be transmitted in the payload (e.g., system data 154) of the frame 150. Once the WUR determines cell-ID(1) and performs timing/frequency synchronization, the WUR may receive and decode the payload which may contain the remaining part of the cell-ID.

In some cases, the WUR may determine that the serving cell has changed. In this case, the WUR may determine to wake-up the main receiver. The main receiver may proceed to perform the legacy procedures such as measurements, cell reselection, etc. The WUR may determine to wake-up the main receiver if at least one of the following scenarios applies:

In a first scenario, the detected cell-ID(1) has changed, for example from the previous system frame to the current system frame. This may be determined by the WUR in the following case as an example: Cell-ID(1) may take values 0, 1, and 2. The current cell-ID(1) previously determined by the WUR is 0. The WUR correlates the received sequence with sequences corresponding to cell-ID(1) values 0, 1, and 2. The correlation of the received signal with the sequence corresponding to cell-ID(1) value 1 or 2 is larger than the correlation of the received signal with the sequence corresponding to the current cell-ID(1) of value 0. The correlation may be performed using a filtered (i.e., averaged) received signal.

In a second scenario, the WUR may keep a counter to count the number of times it has determined that the serving cell has changed (i.e., the correlation of the received signal with a sequence corresponding to another cell-ID(1) is higher). The counter may be reset if correlation of the received signal with the sequence corresponding to the current cell-ID(1) is higher. The WUR may determine to wake-up then main receiver if the counter reaches a predetermined value.

In a third scenario, a measure of the received synchronization signal has deteriorated. For example, the received power has fallen below a threshold. Note that the signal power may be filtered. Alternatively, the cross-correlation of the received signal and the sequence corresponding to cell-ID(1) has fallen below a threshold or is not the largest.

In a fourth scenario, the WUR may decode the frame payload and the cell-ID(2) in the payload is not the same, i.e., has changed from the previous frame to the current frame.

The payload bits in the system frame 150 may be scrambled with a scrambling sequence which is a function of cell-ID(1). A frame check sequence may be added to the frame, and it may be scrambled with a sequence determined from cell-ID(1).

In another embodiment, the payload of the system frame 150 may consist of at least two parts of system data. The first part may contain the cell-ID(2) and the second part may contain other system information. The two parts may have separate frame check sums. The second part may be scrambled with a sequence which may be a function of the cell-ID. The check sum of the second part may be scrambled with a sequence determined from the cell-ID. These methods may also apply to the user frame 100. For example, user frame bits may be scrambled with a sequence determined from one of cell-ID, cell-ID(1), cell -ID(2).

The foregoing disclosure provides illustration and description, but is not intended to be exhaustive or to limit the implementations to the precise form disclosed. Modifications and variations are possible in light of the above disclosure or may be acquired from practice of the implementations.

Figure 3:
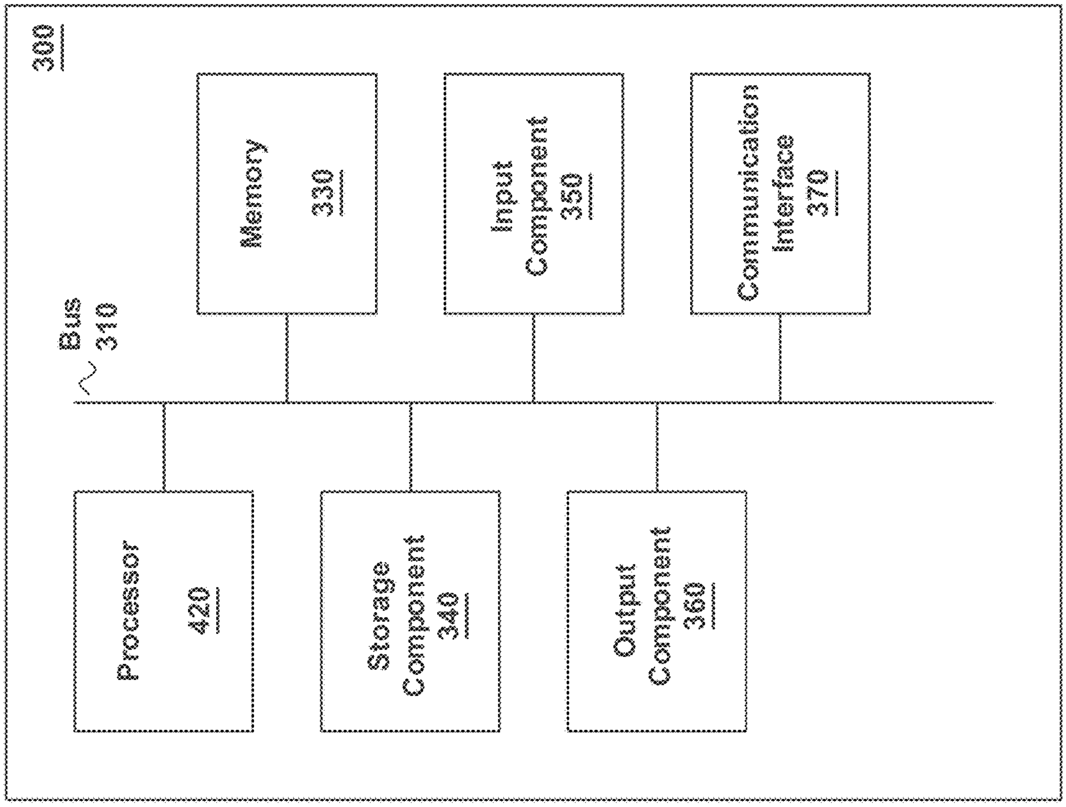
FIG. 3 is a diagram of an example network device in accordance with various embodiments of the present disclosure.

Turning to FIG. 3, the methods and processes described herein may be carried out on device 300, which may correspond to any type of known computer, server, or data processing device. For example, the device 300 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, or any other similar functioning device.

In some embodiments, as shown in FIG. 3, the device 300 may include a set of components, such as a processor 320, a memory 330, a storage component 340, an input component 350, an output component 360, and a communication interface 370.

The bus 310 may comprise one or more components that permit communication among the set of components of the device 300. For example, the bus 310 may be a communication bus, a cross-over bar, a network, or the like. Although the bus 310 is depicted as a single line in FIG. 3, the bus 310 may be implemented using multiple (two or more) connections between the set of components of device 300. The disclosure is not limited in this regard.

The device 300 may comprise one or more processors, such as the processor 320. The processor 320 may be implemented in hardware, firmware, and/or a combination of hardware and software. For example, the processor 320 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general-purpose processor may be a microprocessor, or any conventional processor, controller, microcontroller, or state machine. The processor 320 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 320 may control overall operation of the device 300 and/or of the set of components of device 300 (e.g., the memory 330, the storage component 340, the input component 350, the output component 360, the communication interface 370).

The device 300 may further comprise the memory 330. In some embodiments, the memory 330 may comprise a random-access memory (RAM), a read only memory (ROM), an electrically erasable programmable ROM (EEPROM), a flash memory, a magnetic memory, an optical memory, and/or another type of dynamic or static storage device. The memory 330 may store information and/or instructions for use (e.g., execution) by the processor 320.

The storage component 340 of device 300 may store information and/or computer-readable instructions and/or code related to the operation and use of the device 300. For example, the storage component 340 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 300 may further comprise the input component 350. The input component 350 may include one or more components that permit the device 300 to receive information, such as via user input (e.g., a touch screen, a keyboard, a keypad, a mouse, a stylus, a button, a switch, a microphone, a camera, and the like). Alternatively, or additionally, the input component 350 may include a sensor for sensing information (e.g., a global positioning system (GPS) component, an accelerometer, a gyroscope, an actuator, and the like).

The output component 360 of device 300 may include one or more components that may provide output information from the device 300 (e.g., a display, a liquid crystal display (LCD), light-emitting diodes (LEDs), organic light emitting diodes (OLEDs), a haptic feedback device, a speaker, and the like).

The device 300 may further comprise the communication interface 370. The communication interface 370 may include a receiver component, a transmitter component, and/or a transceiver component. The communication interface 170 may enable the device 300 to establish connections and/or transfer communications with other devices (e.g., a server, another device). The communications may be affected via a wired connection, a wireless connection, or a combination of wired and wireless connections. The communication interface 370 may permit the device 300 to receive information from another device and/or provide information to another device. In some embodiments, the communication interface 370 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively, or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 370 may include an Ethernet interface, an optical interface, a coaxial interface, an infrared interface, a radio frequency (RF) interface, or the like.

The device 300 may perform one or more processes described herein. The device 300 may perform operations based on the processor 320 executing computer-readable instructions and/or code that may be stored by a non-transitory computer-readable medium, such as the memory 330 and/or the storage component 340. A computer-readable medium may refer to a non-transitory memory device. A memory device may include memory space within a single physical storage device and/or memory space spread across multiple physical storage devices.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand- alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor 320 of a general purpose computer, special purpose computer, or other programmable data processing apparatus to produce a machine, such that the instructions, which execute via the processor 320 of the computer or other programmable data processing apparatus, create means for implementing the functions/acts specified in the flowchart and/or block diagram block or blocks. These computer readable program instructions may also be stored in a computer readable storage medium such as memory 330 that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Computer-readable instructions and/or code may be read into the memory 330 and/or the storage component 340 from another computer-readable medium or from another device via the communication interface 370. The computer-readable instructions and/or code stored in the memory 330 and/or storage component 340, if or when executed by the processor 320, may cause the device 300 to perform one or more processes described herein.

Alternatively, or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of (one or more) components shown in FIG. 3 may perform one or more functions described as being performed by another set of components shown in FIG. 3.

Figure 4:
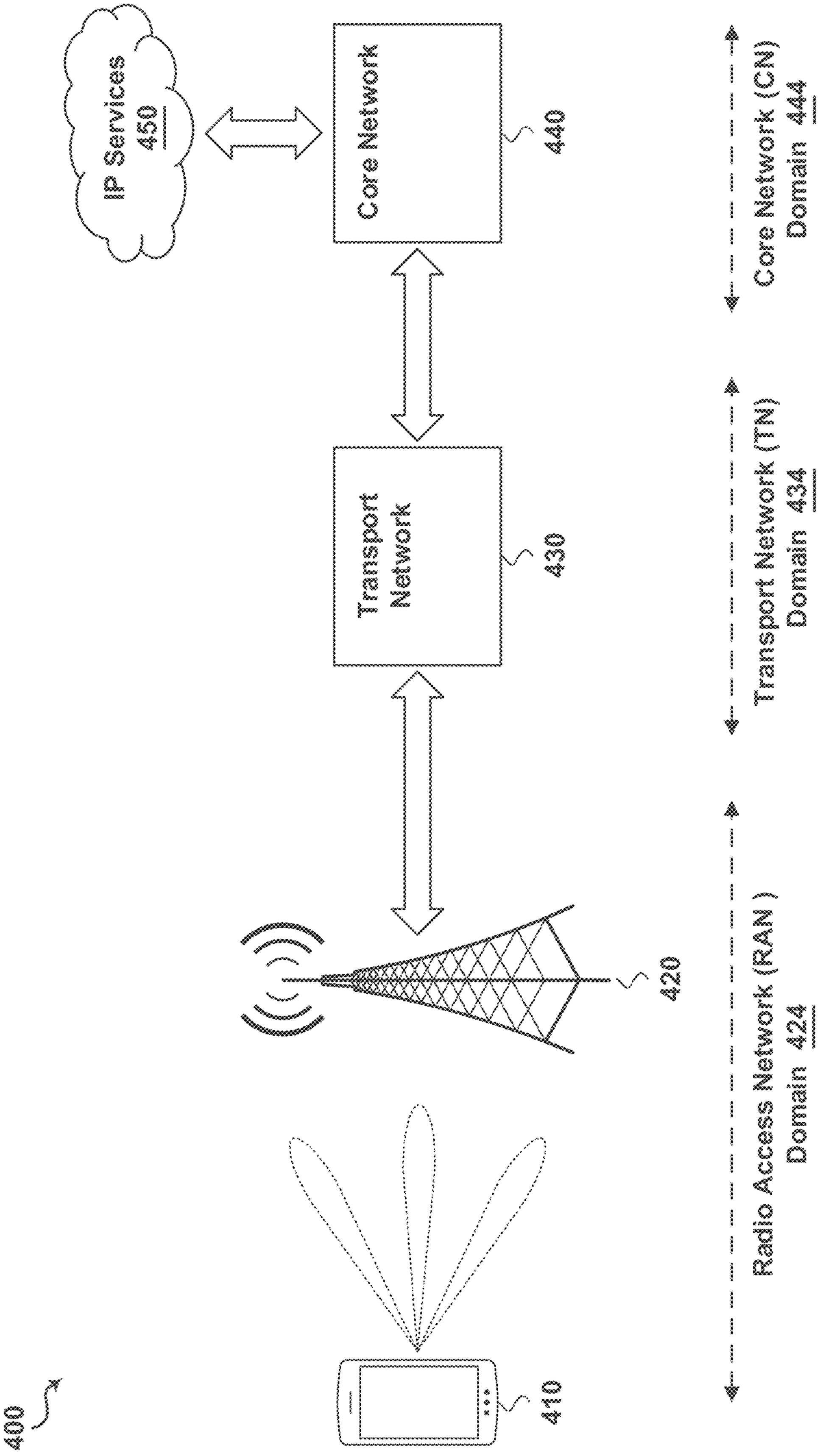
FIG. 4 is a schematic diagram of an example wireless communications system, in accordance with various embodiments of the present disclosure.

FIG. 4 is a diagram illustrating an example of a wireless communications system, according to various embodiments of the present disclosure. The wireless communications system 400 (which may also be referred to as a wireless wide area network (WWAN)) may include one or more user equipment (UE) 410 , one or more base stations 420, at least one transport network 430, and at least one core network 440. The device 300 (FIG. 3) may be incorporated in the UE 410 or the base station 420.

The one or more UEs 410 may access the at least one core network 440 and/or IP services 450 via a connection to the one or more base stations 420 over a RAN domain 424 and through the at least one transport network 430. Examples of UEs 410 may include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similarly functioning device. Some of the one or more UEs 410 may be referred to as Internet-of-Things (IoT) devices (e.g., parking meter, gas pump, toaster, vehicles, heart monitor, etc.). The one or more UEs 410 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile agent, a client, or some other suitable terminology.

The one or more base stations 420 may wirelessly communicate with the one or more UEs 410 over the RAN domain 424. Each base station of the one or more base stations 420 may provide communication coverage to one or more UEs 410 located within a geographic coverage area of that base station 420. In some embodiments, as shown in FIG. 4, the base station 420 may transmit one or more beamformed signals to the one or more UEs 410 in one or more transmit directions. The one or more UEs 410 may receive the beamformed signals from the base station 420 in one or more receive directions. Alternatively, or additionally, the one or more UEs 410 may transmit beamformed signals to the base station 420 in one or more transmit directions. The base station 420 may receive the beamformed signals from the one or more UEs 410 in one or more receive directions.

The one or more base stations 420 may include macrocells (e.g., high power cellular base stations) and/or small cells (e.g., low power cellular base stations). The small cells may include femtocells, picocells, and microcells. A base station 420, whether a macrocell or a large cell, may include and/or be referred to as an access point (AP), an evolved (or evolved universal terrestrial radio access network (E-UTRAN)) Node B (eNB), a next-generation Node B (gNB), or any other type of base station known to one of ordinary skill in the art.

The one or more base stations 420 may be configured to interface (e.g., establish connections, transfer data, and the like) with the at least one core network 440 through at least one transport network 430. In addition to other functions, the one or more base stations 420 may perform one or more of the following functions: transfer of data received from the one or more UEs 410 (e.g., uplink data) to the at least one core network 440 via the at least one transport network 430, transfer of data received from the at least one core network 440 (e.g., downlink data) via the at least one transport network 430 to the one or more UEs 410.

The transport network 430 may transfer data (e.g., uplink data, downlink data) and/or signaling between the RAN domain 424 and the CN domain 444. For example, the transport network 430 may provide one or more backhaul links between the one or more base stations 420 and the at least one core network 440. The backhaul links may be wired or wireless.

The core network 440 may be configured to provide one or more services (e.g., enhanced mobile broadband (eMBB), ultra-reliable low-latency communications (URLLC), and massive machine type communications (mMTC), etc.) to the one or more UEs 410 connected to the RAN domain 424 via the TN domain 434. Alternatively, or additionally, the core network 440 may serve as an entry point for the IP services 450. The IP services 450 may include the Internet, an intranet, an IP multimedia subsystem (IMS), a streaming service (e.g., video, audio, gaming, etc.), and/or other IP services.

Figure 5:
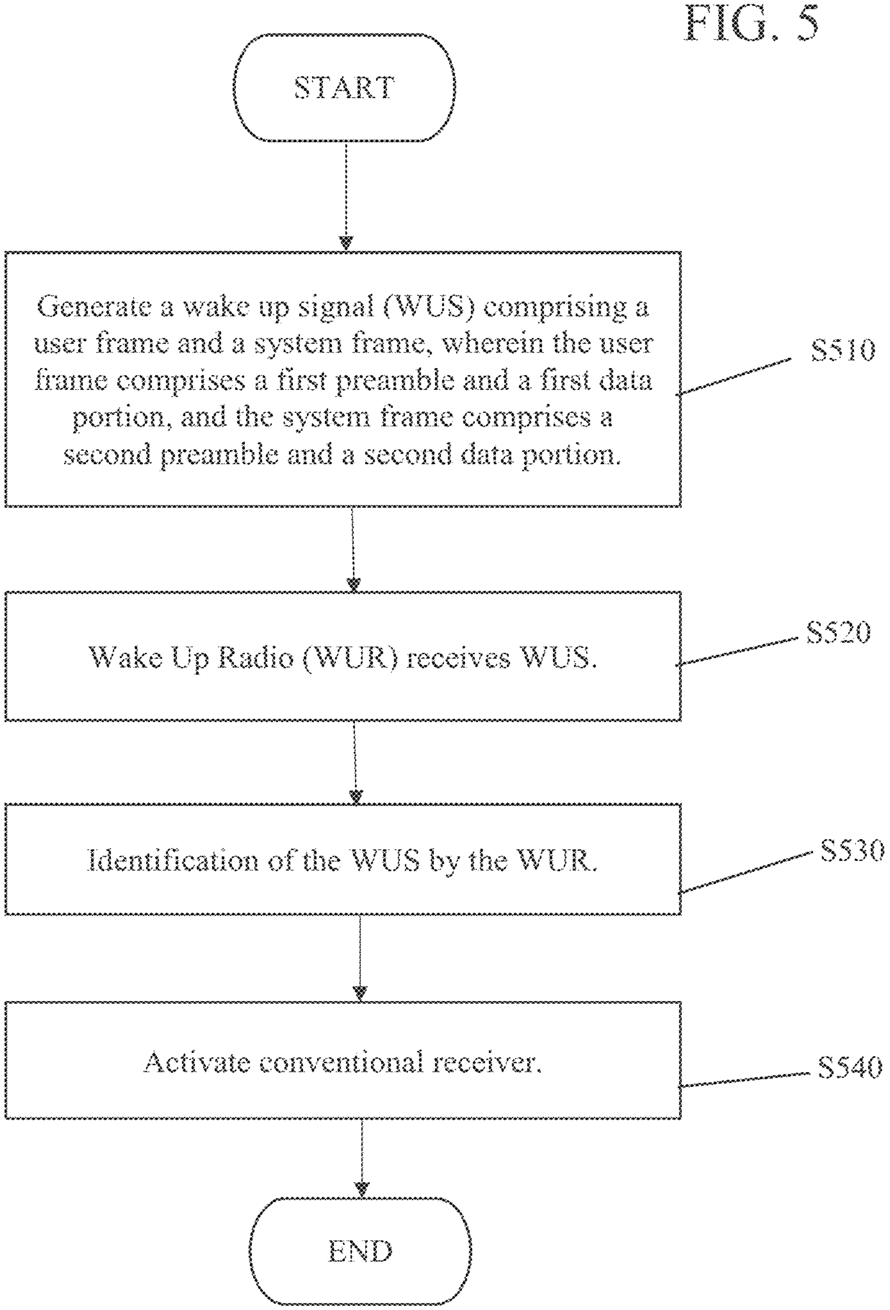
FIG. 5 is a flowchart illustrating a method of generating a WUS in accordance with various embodiments of the present disclosure.

FIG. 5 is a diagram showing an embodiment of the method of generating a WUS disclosed herein. Specifically, the method includes operation S510 wherein a wake up signal (WUS) is generated comprising a user frame and a system frame, wherein the user frame comprises a first preamble and a first data portion, and the system frame comprises a second preamble and a second data portion. This WUS is then received by a wake up radio in operation S520. The WUR recognizes the WUS in operation S530, and in response to the WUS, the wake up radio activates a conventional receiver in operation S540.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function (s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A wireless communication system comprising:

a user equipment comprising a receiver and a wake up radio (WUR), wherein the WUR comprises an at least one WUR processor and an at least one WUR memory, wherein the at least one WUR memory is configured to store computer program code, wherein the WUR is configured to receive, from an at least one cell station, a wake up signal (WUS) comprising a user frame and a system frame, wherein the user frame comprises a first preamble and a first data portion, and the system frame comprises a second preamble and a second data portion, wherein the at least one WUR processor is configured to access the at least one WUR memory and, by executing the computer program code stored therein, identify the WUS and activate the receiver, and wherein the system frame comprises one or more of information on a cell ID, information on a duty cycle of the WUS, a synchronization signal, and information on a coding rate of the user frame.

2. The wireless communications system of claim 1, wherein the user frame comprises an information on a portion of the WUS that should be disregarded by the WUR.

3. The wireless communications system of claim 1, wherein a coding rate of the system frame is different than a coding rate of the user frame.

4. The wireless communication system of claim 1, wherein the first data portion comprises a control portion and a user data portion, the control portion has a different coding rate than the user data portion, and the control portion comprises an information on the coding rate of the user data portion.

5. The wireless communication system of claim 1, wherein the WUS is comprised of one of a plurality of On-Off-Key (OOK) waveform symbols and a plurality of frequency shift key (FSK) waveform symbols.

6. The wireless communication system of claim 1, wherein the at least one WUR processor is further configured to access the at least one WUR memory and, by executing the computer program code stored therein, identify a second cell station in communication with the WUR, and based on the identification of the second cell station activate the receiver.

7. A method of generating a wake up signal (WUS) in a wireless communication system, the wireless communication system comprising a user equipment comprising a receiver and a wake up radio (WUR), the method performed by at least one processor and comprising:

receiving, by the WUR from an at least one cell station, a wake up signal (WUS) comprising a user frame and a system frame, wherein the user frame comprises a first preamble and a first data portion, and the system frame comprises a second preamble and a second data portion;

identifying, by the WUR, the WUS; and based on the identification of the WUS by the WUR, activating the receiver, wherein the system frame comprises one or more of information on a cell ID, information on a duty cycle of the WUS, a synchronization signal, and information on a coding rate of the user frame.

8. The method of claim 7, wherein the user frame comprises an information on a portion of the WUS that should be disregarded by the WUR.

9. The method of claim 7, wherein a coding rate of the system frame is different than a coding rate of the user frame.

10. The method of claim 7, wherein the first data portion comprises a control portion and a user data portion, the control portion has a different coding rate than the user data portion, and the control portion comprises an information on the coding rate of the user data portion.

11. The method of claim 7, wherein the WUS is comprised of one of a plurality of On-Off-Key (OOK) waveform symbols and a plurality of frequency shift key (FSK) waveform symbols.

12. The method of claim 7, further comprising:

identifying, by the WUR, a second cell station in communication with the WUR; and based on the identification of the second cell station by the WUR, causing the receiver to become active.

13. A non-transitory computer readable medium having instructions stored therein, which when executed by a processor cause the processor to execute a method of generating a wake up signal (WUS), the method comprising:

receiving, by a WUR from an at least one cell station, a wake up signal (WUS) comprising a user frame and a system frame, wherein the user frame comprises a first preamble and a first data portion, and the system frame comprises a second preamble and a second data portion;

identifying, by the WUR, the WUS; and based on the identification of the WUS by the WUR, activating the receiver, wherein the system frame comprises one or more of information on a cell ID, information on a duty cycle of the WUS, a synchronization signal, and information on a coding rate of the user frame.

14. The non-transitory computer readable medium of claim 13, wherein the user frame comprises an information on a portion of the WUS that should be disregarded by the WUR.

15. The non-transitory computer readable medium of claim 13, wherein a coding rate of the system frame is different than a coding rate of the user frame.

16. The non-transitory computer readable medium of claim 13, wherein the first data portion comprises a control portion and a user data portion, the control portion has a different coding rate than the user data portion, and the control portion comprises an information on the coding rate of the user data portion.

17. The non-transitory computer readable medium of claim 13, wherein the method further comprises:

identifying, by the WUR, a second cell station in communication with the WUR; and based on the identification of the second cell station by the WUR, causing the receiver to become active.

* * * * *